US008285422B2

(12) United States Patent
Nagao

(10) Patent No.: US 8,285,422 B2
(45) Date of Patent: Oct. 9, 2012

(54) POWER SUPPLY CONTROLLING APPARATUS AND COMPUTER READABLE MEDIUM

(75) Inventor: Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 453 days.

(21) Appl. No.: 12/318,870

(22) Filed: Jan. 9, 2009

(65) Prior Publication Data

US 2009/0179490 A1 Jul. 16, 2009

(30) Foreign Application Priority Data

Jan. 11, 2008 (JP) ................. 2008-005012

(51) Int. Cl.
*G06F 19/00* (2011.01)
(52) U.S. Cl. ........................ 700/286; 714/745
(58) Field of Classification Search .................. 700/286, 700/291; 714/745, 14; 713/323, 322, 340
See application file for complete search history.

(56) References Cited

U.S. PATENT DOCUMENTS

| 7,043,380 B2 * | 5/2006 | Rodenberg et al. ............ 702/62 |
| 2001/0021982 A1 * | 9/2001 | Shimoda ....................... 713/320 |
| 2003/0172318 A1 | 9/2003 | Sugita et al. |
| 2003/0188210 A1 * | 10/2003 | Nakazato ..................... 713/320 |
| 2004/0239181 A1 * | 12/2004 | Obayashi et al. ............. 303/152 |
| 2005/0289367 A1 * | 12/2005 | Clark et al. ................... 713/300 |
| 2007/0255969 A1 | 11/2007 | Theobald |
| 2008/0129538 A1 * | 6/2008 | Vaswani et al. .......... 340/870.03 |
| 2008/0294920 A1 * | 11/2008 | Hatasaki et al. .............. 713/323 |

FOREIGN PATENT DOCUMENTS

| JP | 10-63378 | 3/1998 |
| JP | 2003-263373 | 9/2003 |
| JP | 2004-348317 | 12/2004 |
| WO | 2007/011184 A1 | 1/2007 |

OTHER PUBLICATIONS

Chinese Office Action dated Dec. 31, 2010 in application No. 200910001625.9.
Communication issued by the European Patent Office on Oct. 13, 2011 in the corresponding European patent application.
Office Action issued by the Japanese Patent Office on Dec. 6, 2011 in the corresponding Japanese patent application No. 2008-005012.

* cited by examiner

*Primary Examiner* — Kidest Bahta
(74) *Attorney, Agent, or Firm* — Staas & Halsey LLP

(57) ABSTRACT

A power supply controlling apparatus includes: a control portion that measure a consumption current value of a current supplied to a controlled device, and controls on/off of the current supplied to the controlled device; a communication portion that transmits a given command to the controlled device, and receives a response to the given command; and a monitor portion that monitors a state of the controlled device based on the consumption current value of the controlled device measured by the control portion, and a life or death state of the controlled device by the given command.

12 Claims, 11 Drawing Sheets

FIG. 2A

| PORT NUMBER | SETTING NUMBER | CONDITION DATA |
|---|---|---|
| 1 | 1 | a |
| 2 | 2 | b |
| 3 | 3 | c |
| 4 | 4 | d |

FIG. 2B

| PORT NUMBER | SETTING NUMBER | CONDITION DATA |
|---|---|---|
| 1 | 1 | a |
| 2 | 2 | b |
| 3 | 4 | d |
| 4 | 4 | d |

FIG. 2C

| PORT NUMBER | SETTING NUMBER | CONDITION DATA |
|---|---|---|
| 1 | 1 | a |
| 2 | 2 | b |
| 3 | 4 | d |
| 4 | 3 | c |

POWER SUPPLY CONTROLLING APPARATUS AND COMPUTER READABLE MEDIUM

BACKGROUND OF THE INVENTION

1. Field of the Invention

The present invention relates to a power supply controlling apparatus and a computer readable medium which controls power supply to a controlled device.

2. Description of the Related Art

Conventionally, there has been known a power supply controlling apparatus which, when a distributed computer does not normally operate though an AC power supply of the distributed computer has been turned on, can specify the cause of abnormality (the abnormality of a DC power supply, the abnormality of an AC power supply, the abnormality of communication, and so on).

The power supply controlling apparatus includes: an AC power supply control unit that applies the AC power supply to the distributed computer by an instruction of turning on the power supply from a host computer; a DC detection unit that receives a DC voltage value from the distributed computer; a communication control unit that communicates with the distributed computer; a control unit that stores an AC power supply state, a DC power supply state, and a communication state which are notified from the AC power supply control unit, the DC detection unit, and the communication control unit, into a power supply state table; and a host communication unit that notifies the host computer of the power supply state table.

However, the power supply controlling apparatus of Japanese Laid-Open Patent Publication No. 10-63378 is limited to the usage of monitoring the distributed computer, and the controlled device becomes always the distributed computer. Therefore, the power supply controlling apparatus does not have general versatility. Although the AC power supply and the DC power supply may enter an ON state, an OFF state, a start-up state, and a stand-by state, the power supply controlling apparatus of Japanese Laid-Open Patent Publication No. 10-63378 only detects abnormality of the AC power supply and the DC power supply. Therefore, the power supply controlling apparatus cannot accurately detect these states as described above.

SUMMARY OF THE INVENTION

It is an object of the present invention to provide a power supply controlling apparatus and a computer readable medium which can accurately monitor a state of a controlled device.

According to an aspect of the present invention, there is provided a power supply controlling apparatus including: a control portion that measure a consumption current value of a current supplied to a controlled device, and controls on/off of the current supplied to the controlled device; a communication portion that transmits a given command to the controlled device, and receives a response to the given command; and a monitor portion that monitors a state of the controlled device based on the consumption current value of the controlled device measured by the control portion, and a life or death state of the controlled device by the given command.

With the above arrangement, the controlled device is monitored by a double method, so that the state of the controlled device can be monitored accurately.

BRIEF DESCRIPTION OF THE DRAWINGS

Preferred embodiments of the present invention will be described in detail with reference to the following drawings, wherein:

FIG. 2A is a diagram showing an example of table data including a setting number, a port number, and condition data;

FIGS. 2B and 2C are diagram showing examples in which the setting numbers and the condition data corresponding to the port numbers "3" and "4" are changed;

FIG. 3 is a diagram showing a state of the power supply controlling apparatus 1 when a storage media 21 is connected to a port 14a;

FIG. 9 is a flowchart showing a check process when current output turns on;

DESCRIPTION OF THE PREFERRED EMBODIMENTS

A description will now be given, with reference to the accompanying drawings, of an embodiment of the present invention.

Figure 1:
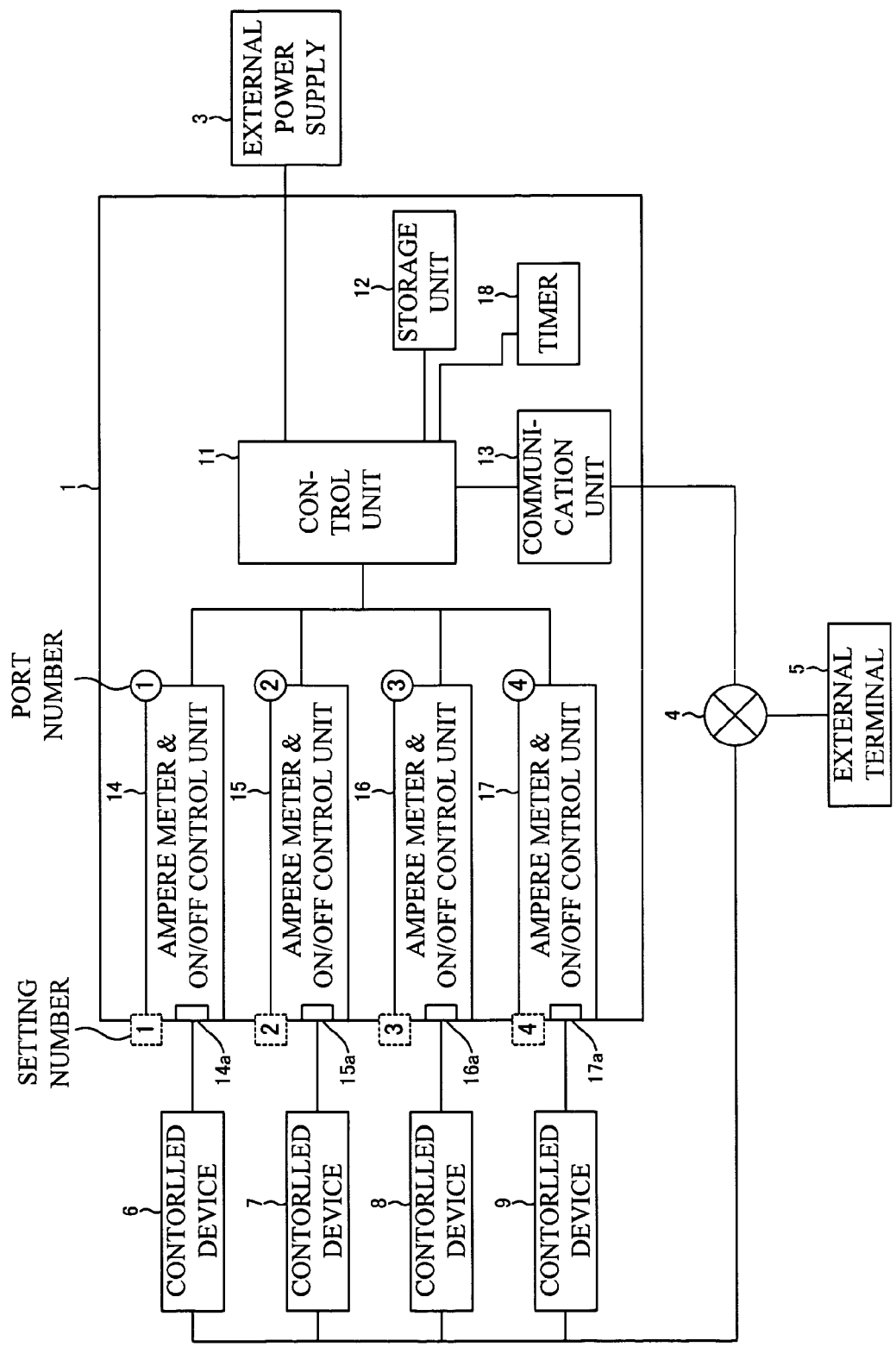
FIG. 1 is a schematic diagram showing the construction of a system including a power supply controlling apparatus according to an embodiment of the present invention.
Figure 3:
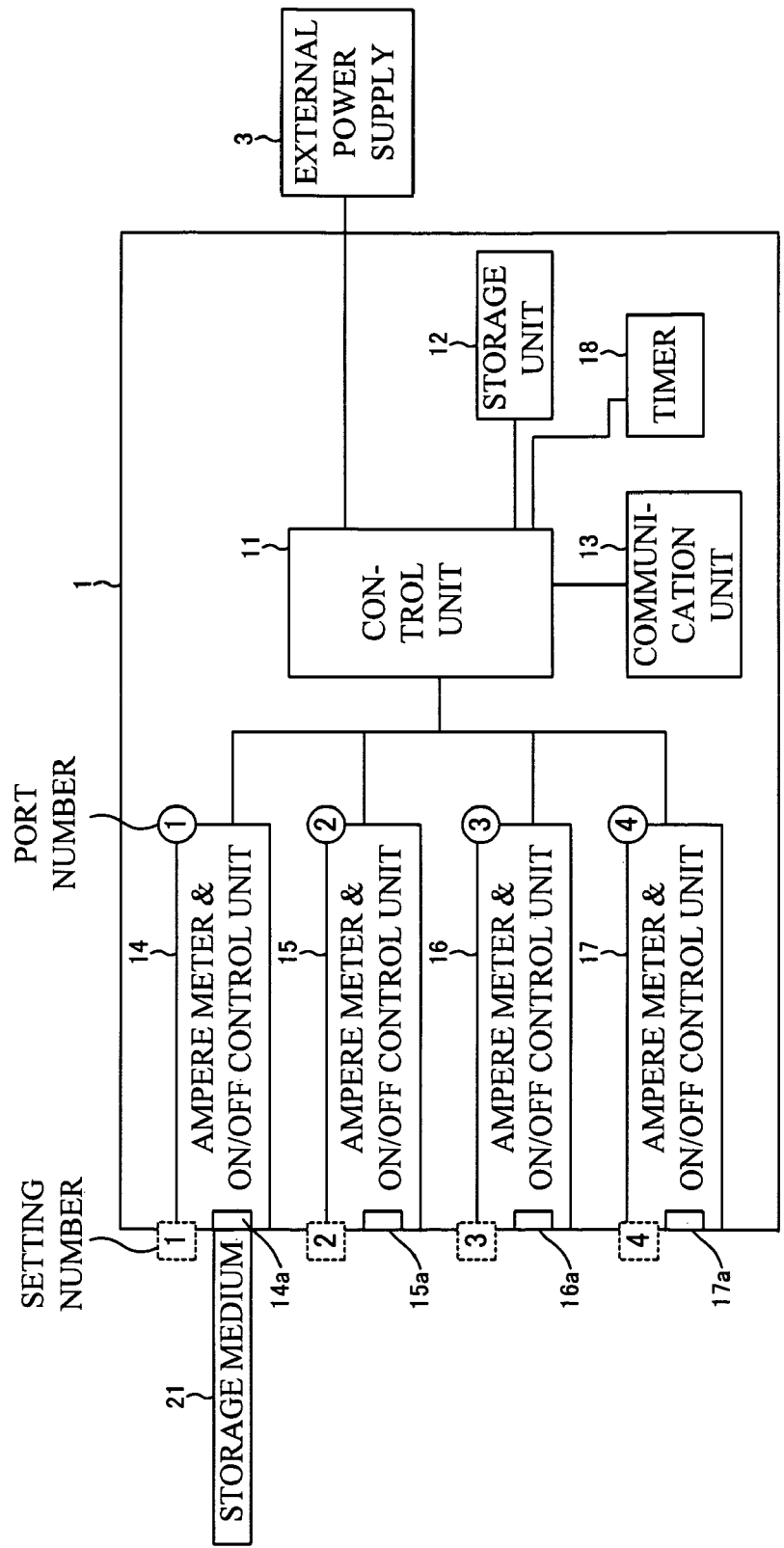

FIG. 1 is a schematic diagram showing the construction of a system including a power supply controlling apparatus according to an embodiment of the present invention.

The system in FIG. 1 includes a power supply controlling apparatus 1, an external power supply 3, an external terminal 5, and controlled devices 6 to 9. The power supply controlling apparatus 1 includes: a control unit 11 (a monitor portion) that controls the entire power supply controlling apparatus 1; a storage unit 12 (a storage portion) that stores various programs, table data, and so on; a communication unit 13 (a communication portion) that communicates with the external terminal 5 or the controlled devices 6 to 9; ampere meters & on/off control units 14 to 17 (control portions) that measure currents supplied from ports 14a to 17a to the controlled devices 6 to 9, and controls the on/off of the currents supplied to the controlled devices 6 to 9, respectively; and a timer 18 that counts up the current date and time. The ampere meters & on/off control units 14 to 17 includes ports 14a to 17a (connection portions), and the ports 14a to 17a are connected to the controlled devices 6 to 9 via power supply lines, respectively. The timer 18 is connected to the control unit 11, and notifies the control unit 11 of information of the current date and time.

The communication unit 13 is connected to the external terminal 5 and the controlled devices 6 to 9 via the network 4 by wire or wireless. The communication unit 13 transmits ping commands to the controlled devices 6 to 9 by ICMP (Internet Control Message Protocol), and receives responses of the ping commands. Also, the communication unit 13 transmits the states (including an ON state, an OFF state, a start-up state, a stand-by state, and a failure state) of the power supply controlling apparatus 1 and the controlled devices 6 to 9 to the external terminal 5 with an electronic mail, or the like.

The external terminal 5 is composed of a computer, a mobile phone, or the like. The controlled devices 6 to 9 are devices that operate by the current, such as computers, monitors, printers, facsimile machines, or scanners, and any other devices that operate by the current may be used as the controlled devices 6 to 9.

The single external power supply 3 is connected to the control unit 11 and the ampere meters & on/off control units 14 to 17, supplies the current to the controlled devices 6 to 9 via the ampere meters & on/off control units 14 to 17, and supplies the current to other components via the control unit 11.

In FIG. 1, a numeral in each quadrangular dashed line indicates a setting number assigned to each port, and a numeral in each circle indicates a port number. With respect to initial values of the setting number, numbers "1" to "4" are set to the ports 14a to 17a in order, as shown in FIG. 1. The setting number, the port number, and condition data of each port are stored into the storage unit 12 as a table data. FIG. 2A shows an example of the table data including the setting number, the port number, and the condition data.

The condition data represents data which provides a condition deciding execution or cancellation of the current supply. For example, the condition data includes data in which the current supply from the port where the controlled device which has requested the power supply last is connected is turned off when the current supplied to the ports 14a to 17a exceeds 15 A in total, data in which the current supply from the port 14a is turned off at 11:00 PM-7:00 AM, data in which the controlled devices 6 to 9 become the stand-by state or no stand-by state, or the like.

The user can change the setting number and the condition data manually via the external terminal 5, and the control unit 11 can change or edit the setting number and the condition data by an automatic process. Further, the control unit 11 can change or edit the setting number and the condition data by notification from the controlled devices 6 to 9 via the network 4 and, the communication unit 13. For example, when the controlled devices 8 and 9 are reset to connect the controlled devices 9 and 8 to the ports 16a and 17a (port numbers "3" and "4"), respectively, the control unit 11 changes the setting number corresponding to the port number "3" from "3" to "4", and the condition data from "c" to "d", as shown in FIG. 2B. At the same time, the control unit 11 changes the setting number corresponding to the port number "4" from "4" to "3", and the condition data from "d" to "c" (see FIG. 2C). Thus, even if the controlled device connected to each port is reset, a relationship between each controlled device, and the setting number and the condition data is maintained, so that current control set to each controlled device can be executed accurately.

For example, when only the setting number is changed (i.e., the setting number is changed from "3" to "4"), the control unit 11 changes the condition data (i.e., changes the condition data from "c" to "d") so as to maintain a relationship between the setting number and the condition data. When only the condition data is changed, the control unit 11 changes the setting number (i.e., changes the setting number from "3" to "4") so as to maintain a relationship between the setting number and the condition data. The port numbers corresponding to the setting numbers may be interchanged from the state of FIG. 2A.

It should be noted that, when the user edits the setting number and the condition data via the external terminal 5, the relationship between the setting number and the condition data is not maintained.

Figure 4A:
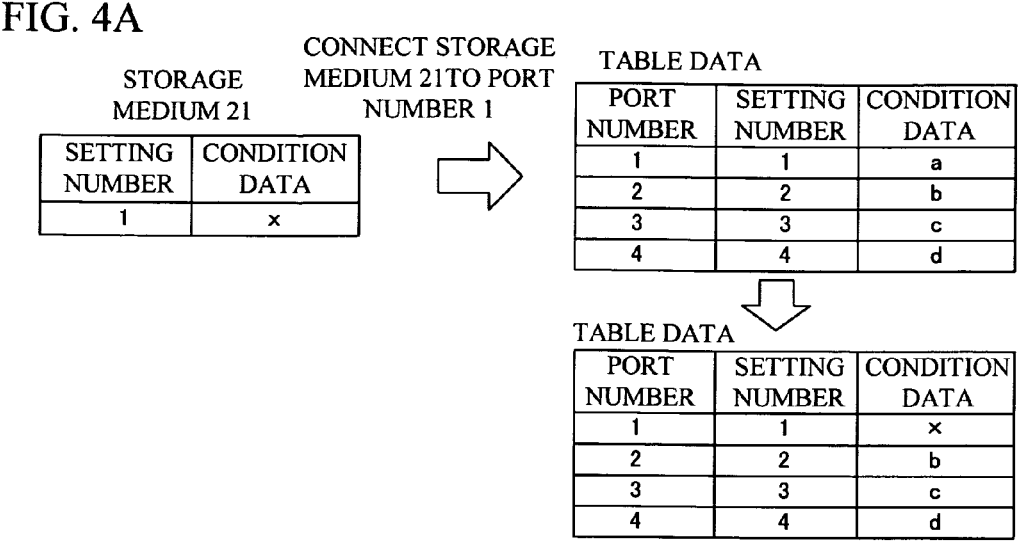
FIG. 4A is a diagram showing an example in which the condition data in the table data is rewritten by condition data stored into the storage media 21.
Figure 4B:
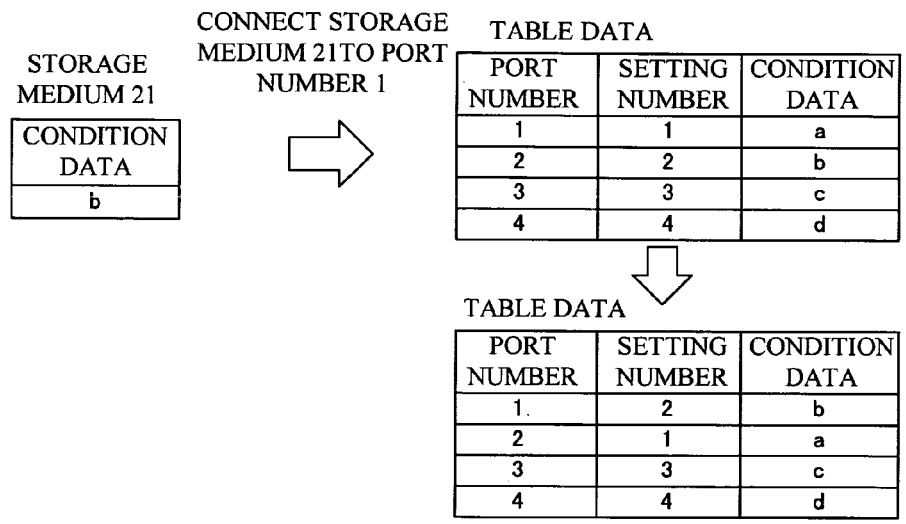
FIG. 4B is a diagram showing an example in which two sets of the setting number and the condition data are interchanged according to the condition data stored into the storage media 21.
Figure 4C:
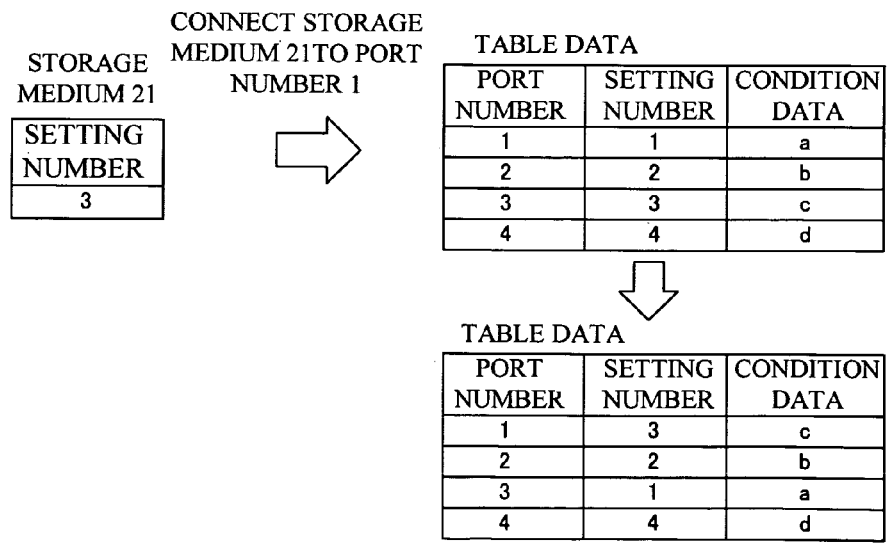
FIG. 4C is a diagram showing an example in which two sets of the setting number and the condition data are interchanged according to the setting number stored into the storage media 21.

For example, when the ports 14a to 17a are provided with terminals for connection of a storage medium (e.g. USB terminals), not shown, if a storage medium 21 which stores at least one of the setting number and the condition data is connected to the port 14a, the control unit 11 reads out at least one of the setting number and the condition data stored into the storage medium 21, and edits the contents of the table data stored into the storage medium 21, i.e., interchanges or rewrites at least one of the setting number and the condition data in the table data. FIG. 4A shows an example in which the condition data in the table data is rewritten by the condition data stored into the storage media 21, FIG. 4B shows an example in which two sets of the setting number and the condition data are interchanged according to the condition data stored into the storage media 21, and FIG. 4C shows an example in which two sets of the setting number and the condition data are interchanged according to the setting number stored into the storage media 21. It should be noted that, when the setting number and the condition data are rewritten, the setting number and the condition data are previously stored into the storage medium 21, and when the two sets of the setting number and the condition data are interchanged, at least one of the setting number and the condition data is previously stored into the storage medium 21.

Thus, by using the storage medium 21 storing at least one of the setting number and the condition data, the two sets of the setting number and the condition data in the table data are interchanged or at least one of the setting number and the condition data in the table data is rewritten, and hence it is possible to control the controlled devices 6 to 9 based on the proper condition data.

The storage medium 21 is composed of a USB memory and so on, for example, and is connectable to any of the ports 14a to 17a. Also, the storage medium 21 may be incorporated into a power supply cable that connects between the port 14a and the controller 6, for example. In this case, a communication line is contained in the power supply cable so that the control unit 11 can access the storage medium 21.

Figure 5C:
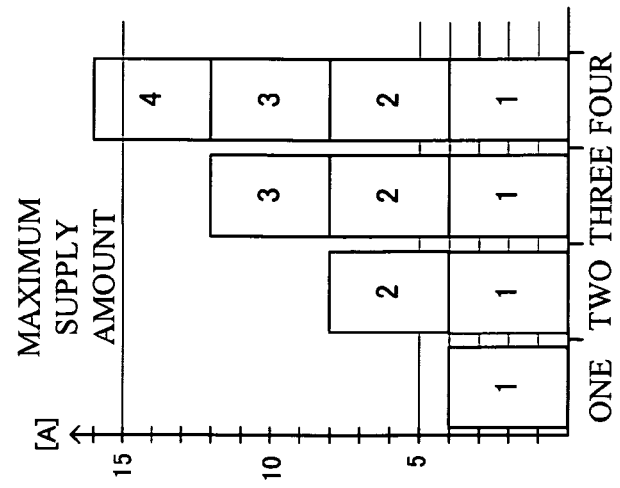
FIG. 5C is a diagram showing a total value of the consumption currents of controlled devices 6 to 9.
Figure 5B:
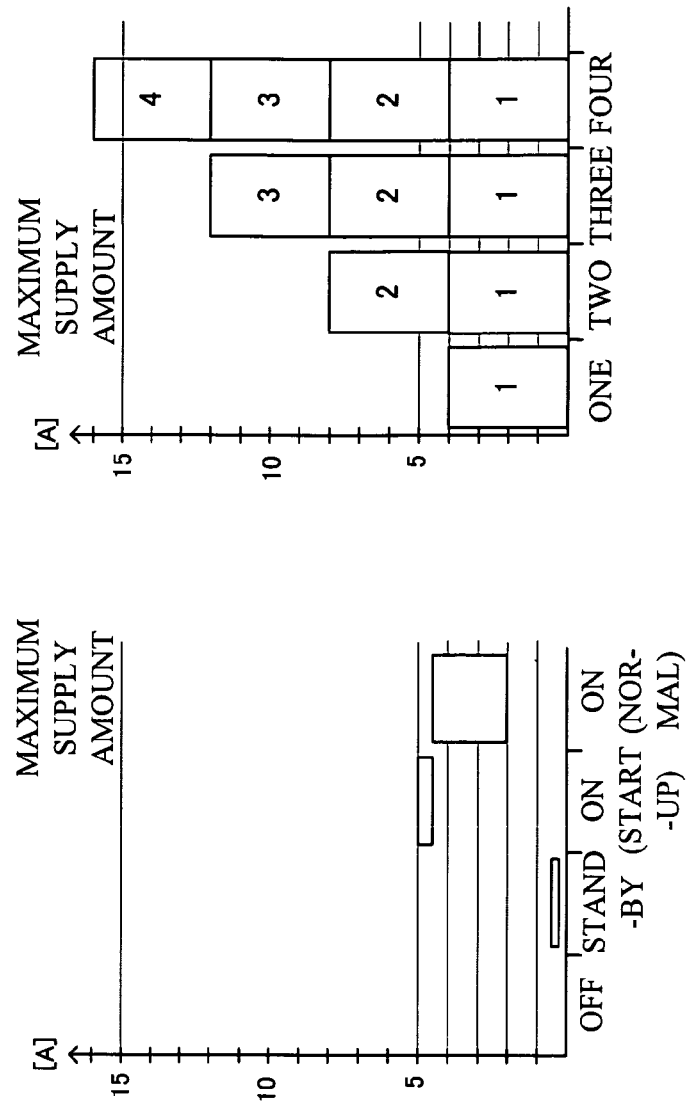
FIG. 5B is a diagram showing a consumption current in each of off/stand-by/on states of the controlled device 6 when the controlled device 6 is a computer.
Figure 5A:
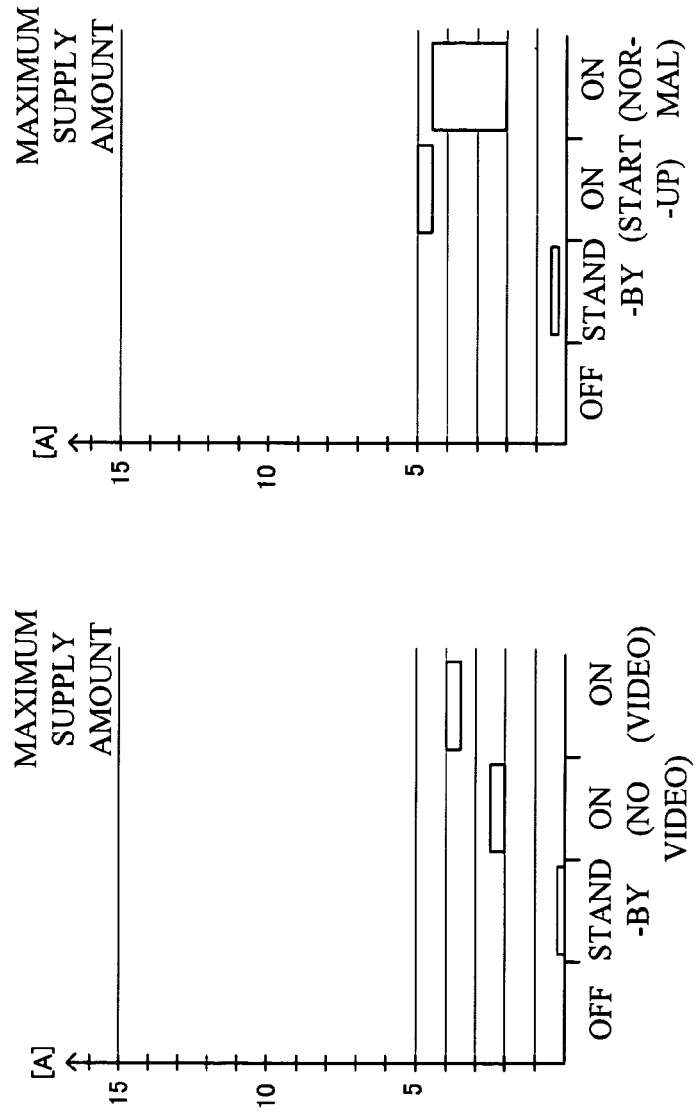
FIG. 5A is a diagram showing a consumption current in each of off/stand-by/on states of the controlled device 6 when the controlled device 6 is a monitor.

FIG. 5A is a diagram showing a consumption current in each of off/stand-by/on states of the controlled device 6 when the controlled device 6 is a monitor, FIG. 5B is a diagram showing a consumption current in each of off/stand-by/on states of the controlled device 6 when the controlled device 6 is a computer, FIG. 5C is a diagram showing a total value of the consumption currents of the controlled devices 6 to 9. It should be noted that, in FIGS. 5A and 5B, the controlled device 6 is used as a representative of the controlled devices.

It is assumed that a maximum value of the currents which the power supply controlling apparatus 1 can supply to the controlled devices 6 to 9 is 15 A, as shown in FIGS. 5A to 5C, for example.

In FIG. 5A, the consumption current of the monitor is 0 A when the power supply of the monitor is in the off state. The stand-by state indicates that a main power supply of the monitor is in the on state, and a power supply button of a remote control is in the off state. In this case, the consumption current of the monitor is 0.01 A to 0.03 A. When the main power supply of the monitor and the power supply button of the remote control are the on states, but video data is not displayed on the monitor, the consumption current of the monitor is 2 A to 2.5 A. When the main power supply of the monitor and the power supply button of the remote control are the on states, and video data is displayed on the monitor, the consumption current of the monitor is 3.5 A to 4 A.

Though the main power supply of the monitor and the power supply button of the remote control are the on states, and the video data should be displayed on the monitor, when the consumption current of the monitor is lower than 3.5 A and higher than 2.5 A, the control unit 11 determines that a video output source is malfunction or a display unit of the monitor is malfunction.

In FIG. 5B, the consumption current of the computer is 0 A when the power supply of the computer is in the off state. The consumption current of the computer in the stand-by state is 0.2 A to 0.5 A. The consumption current is 3.5 A to 4 A when the computer starts up, and the consumption current is 2 A to 3.5 A when the computer stably operates (normal time). For example, when the consumption current of the computer is higher than 0.5 A and lower than 2 A, the control unit 11 determines that the computer is malfunction.

The above-mentioned values of the consumption current are examples. When the power supply controlling apparatus 1 is really used, the ampere meters & on/off control units 14 to 17 measure the values of the consumption currents of the controlled devices 6 to 9, and the control unit 11 stores these values into the storage unit 12.

It is assumed that, in FIG. 5C, the controlled devices 6 to 9 are monitors that normally operate, for example. In this case, a maximum value of the consumption current of one monitor is 4 A, and hence when the currents are supplied to four monitors, an amount of the current supply exceeds 15 A as the maximum value of the current supply. Therefore, the control unit 11 controls the ampere meters & on/off control units 14 to 17 so as not to supply the current to one monitor based on the condition data, i.e., so as to turn off the current supply corresponding to one monitor based on the condition data.

For example, when the controlled devices 6 to 9 are the computers, a maximum value of the consumption current of one computer on start-up time is 4 A. When the currents are supplied to the four computers, an amount of the current supply exceeds 15 A as the maximum value of the current supply. Therefore, the control unit 11 controls the ampere meters & on/off control units 14 to 17 so as not to simultaneously supply the currents to the four computers monitor based on the condition data, i.e., so as to delay the timing of the current supply to one to three monitor(s) based on the condition data.

Figure 6:
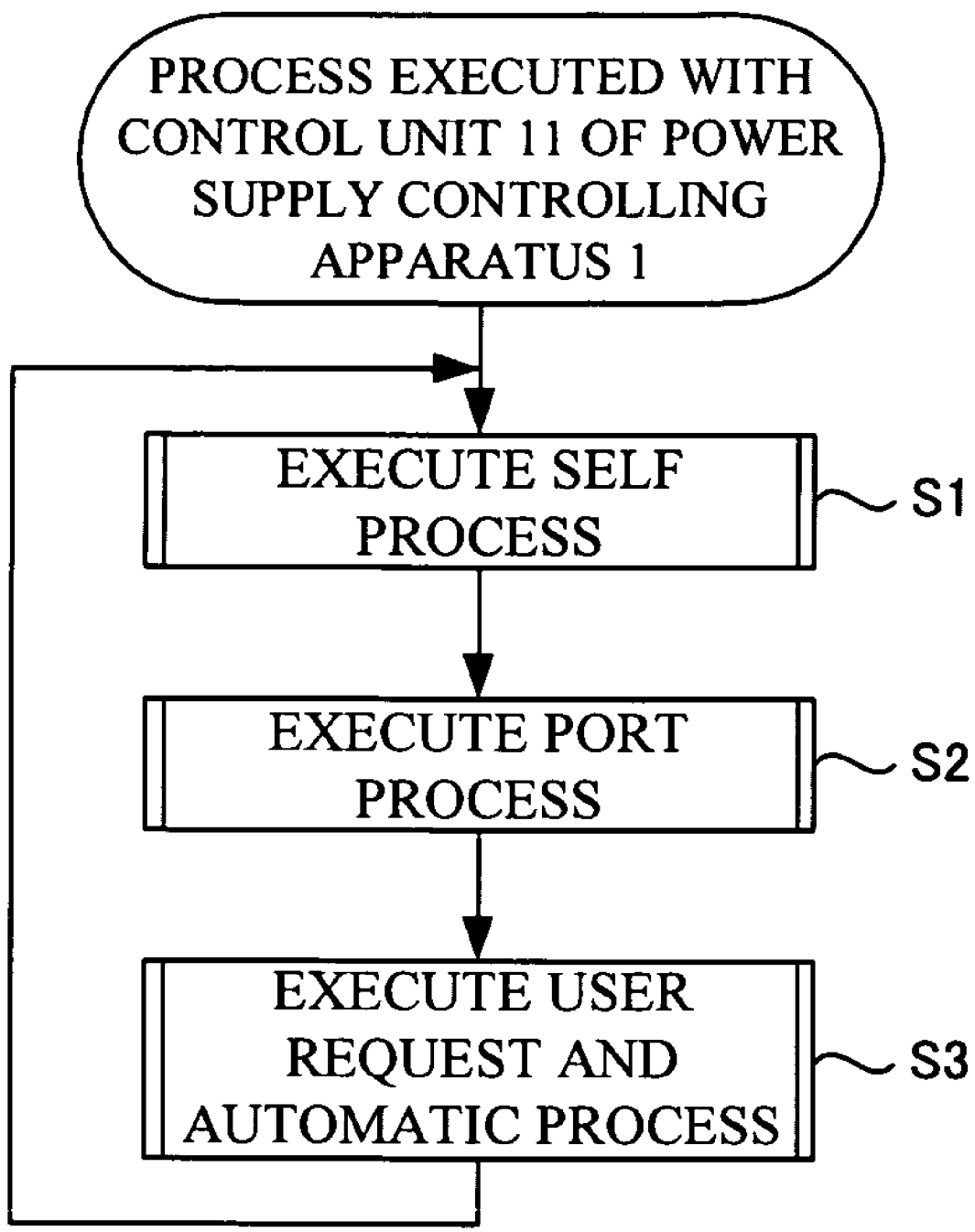
FIG. 6 is a flowchart showing a process executed with a control unit 11 of the power supply controlling apparatus 1.

FIG. 6 is a flowchart showing a process executed with the control unit 11 of the power supply controlling apparatus 1. It is assumed that the consumption currents of the controlled devices 6 to 9 are previously measured and the control unit 11 stores the values of the consumption currents into the storage unit 12 before the present process is executed.

First, the control unit 11 executes a self process (step S1). The self process represents a process which determines whether the power supply controlling apparatus 1 itself is malfunction. The self process will be described later in detail.

Next, the control unit 11 executes a port process (step S2). The port process represents a process which executes failure determination of the controlled devices 6 to 9 based on the currents supplied from the ports 14a to 17a to the controlled devices 6 to 9, respectively, and a process which determines life or death of the controlled devices 6 to 9 according to transmitting ping commands to the controlled devices 6 to 9 and whether or not the responses are received from the controlled devices 6 to 9. The port process will be described later in detail.

Next, the control unit 11 executes a user request and automatic process (step S3). The user request and automatic process represents a process executed with the control unit 11 based on a request or the condition data from the external terminal 5. The user request and automatic process will be described later in detail.

These processes of steps S1 to S3 are repeatedly executed while the power supply is supplied to the power supply controlling apparatus 1.

Figure 7:
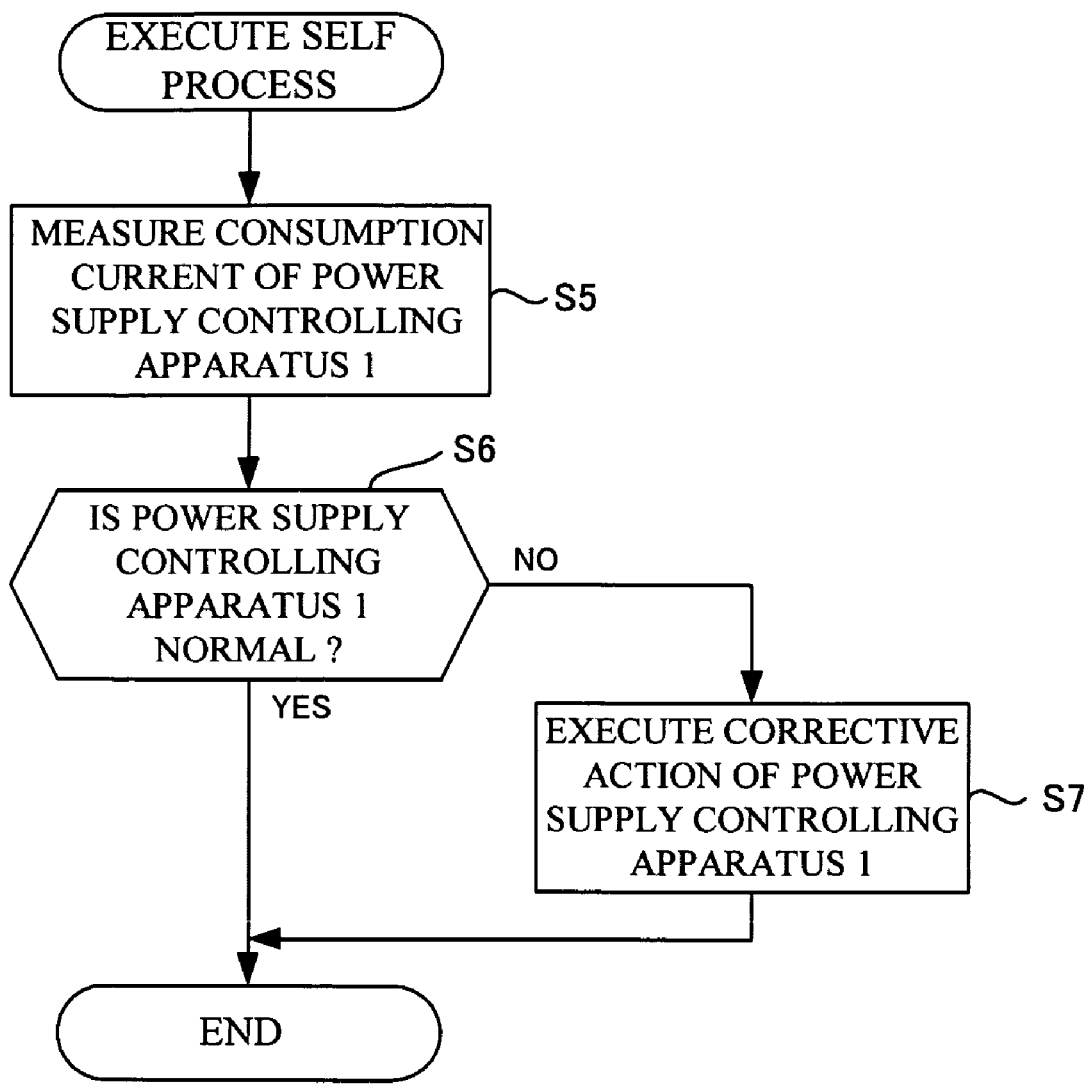
FIG. 7 is a flowchart showing in detail a self process in step S1 of FIG. 6.

FIG. 7 is a flowchart showing in detail the self process in step S1 of FIG. 6.

First, the control unit 11 measures the voltage of the power supply supplied from the external power supply 3, and the consumption current of to the power supply controlling apparatus 1 itself (step S5). Next, the control unit 11 determines whether the power supply controlling apparatus 1 itself is normal (step S6). Specifically, the control unit 11 previously stores consumption current value data supplied to itself, the storage unit 12, the communication unit 13, the ampere meters & on/off control units 14 to 17, and the timer 18, compares the consumption current value data with real consumption current value, and determines whether the power supply controlling apparatus 1 itself is normal.

When the answer to the determination of step S6 is "YES", the process is terminated. When the answer to the determination of step S6 is "NO", the control unit 11 executes corrective action of the power supply controlling apparatus 1 (step S7). Specifically, the control unit 11 transmits an electronic mail showing the failure or malfunction of the power supply controlling apparatus 1 to the external terminal 5 via the communication unit 13, as the corrective action of the power supply controlling apparatus 1. Also, when there is a failure alert lamp, not shown, in the power supply controlling apparatus 1, the control unit 11 turns on the failure alert lamp as the corrective action of the power supply controlling apparatus 1.

Figure 8:
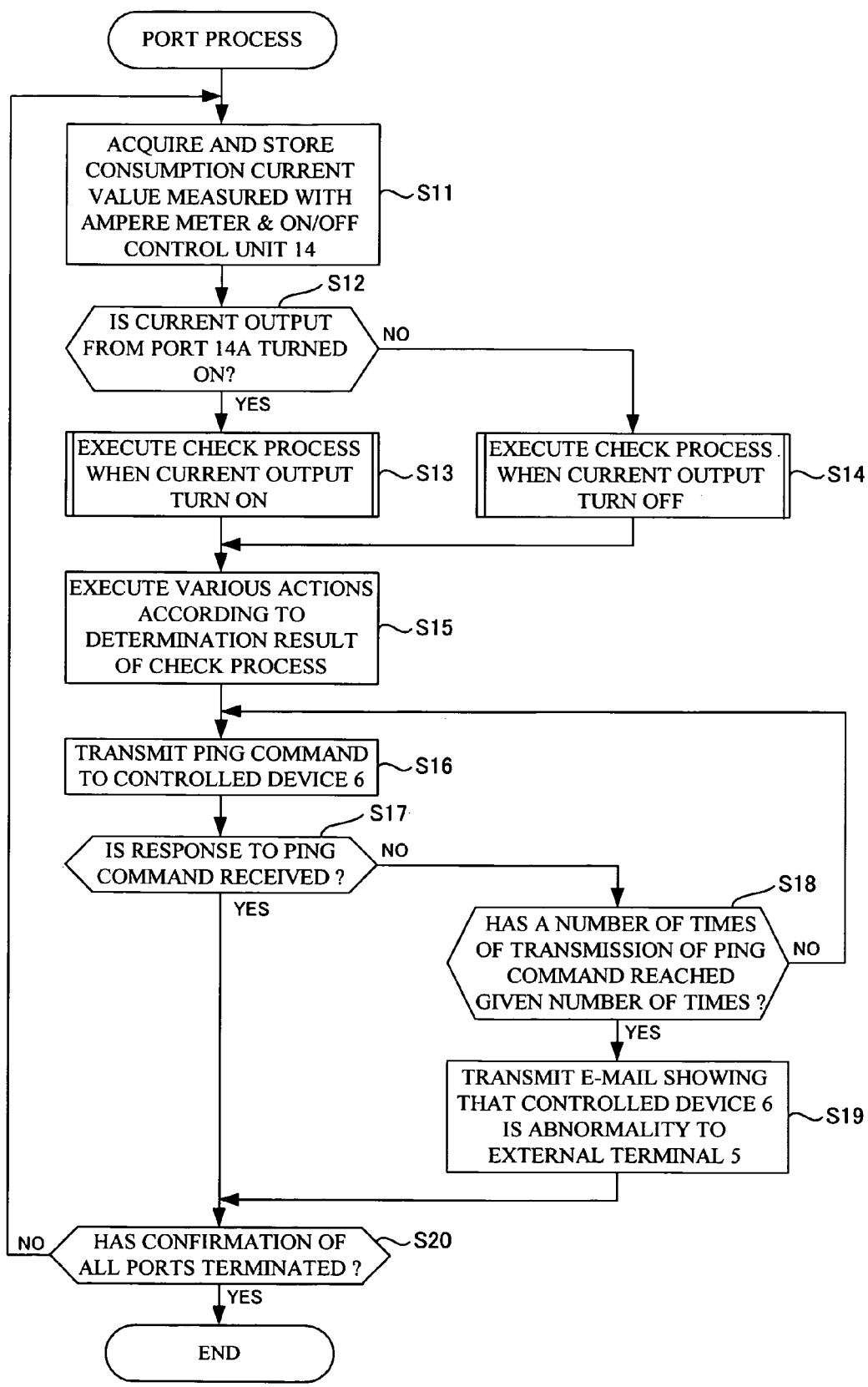
FIG. 8 is a flowchart showing in detail a port process in step S2 of FIG. 6.

FIG. 8 is a flowchart showing in detail the port process in step S2 of FIG. 6.

First, the control unit 11 acquires a consumption current value which is output from the port 14a and measured with the ampere meter & on/off control unit 14, and stores the consumption current value into the storage unit 12 (step S11). When the answer to the determination of step S20 described later is "NO", and the procedure of step S11 is executed again, a consumption current value output from the port 15a is stored into the storage unit 12. That is, the consumption current values output from the ports 14a to 17a are sequentially stored into the storage unit 12 by a loop of steps S11 to S20. Although in the following procedures, a description will now be given of the port 14a as an example, the same procedures are executed by the loop of steps S11 to S20 with respect to the ports 15a to 17a.

The control unit 11 determines whether the ampere meter & on/off control unit 14 turns on the current output from the port 14a (step S12).

When the answer to the determination of step S12 is "YES", the control unit 11 executes a check process when the current output turns on (step S13). When the answer to the determination of step S12 is "NO", the control unit 11 executes a check process when the current output turns off (step S14). In the check process when the current output turns on, the control unit 11 checks the consumption current and the state of the controlled device 6, normal/abnormality of the power supply controlling apparatus 1 and the controlled device 6, and so on, in a state of turning on the current output from the port 14a. The check process when the current output turns on will be described later in detail. In the check process when the current output turns off, the control unit 11 checks normal/abnormality of the power supply controlling apparatus 1 and the controlled device 6, and so on, in a state of turning off the current output from the port 14a. The check process when the current output turns off will be described later in detail.

The control unit 11 executes various actions according to the determination result of the check process in step S13 when the current output turns on, or the check process in step S14 when the current output turns off (step S15). The determination result of the check process when the current output turns on indicates the procedure of step S24, S25, S27, S30, S32, or S33 in FIG. 9 described later, and the determination result of the check process when the current output turns off indicates the procedure of step S42, S44, or S45 in FIG. 10 described later.

Figure 9:
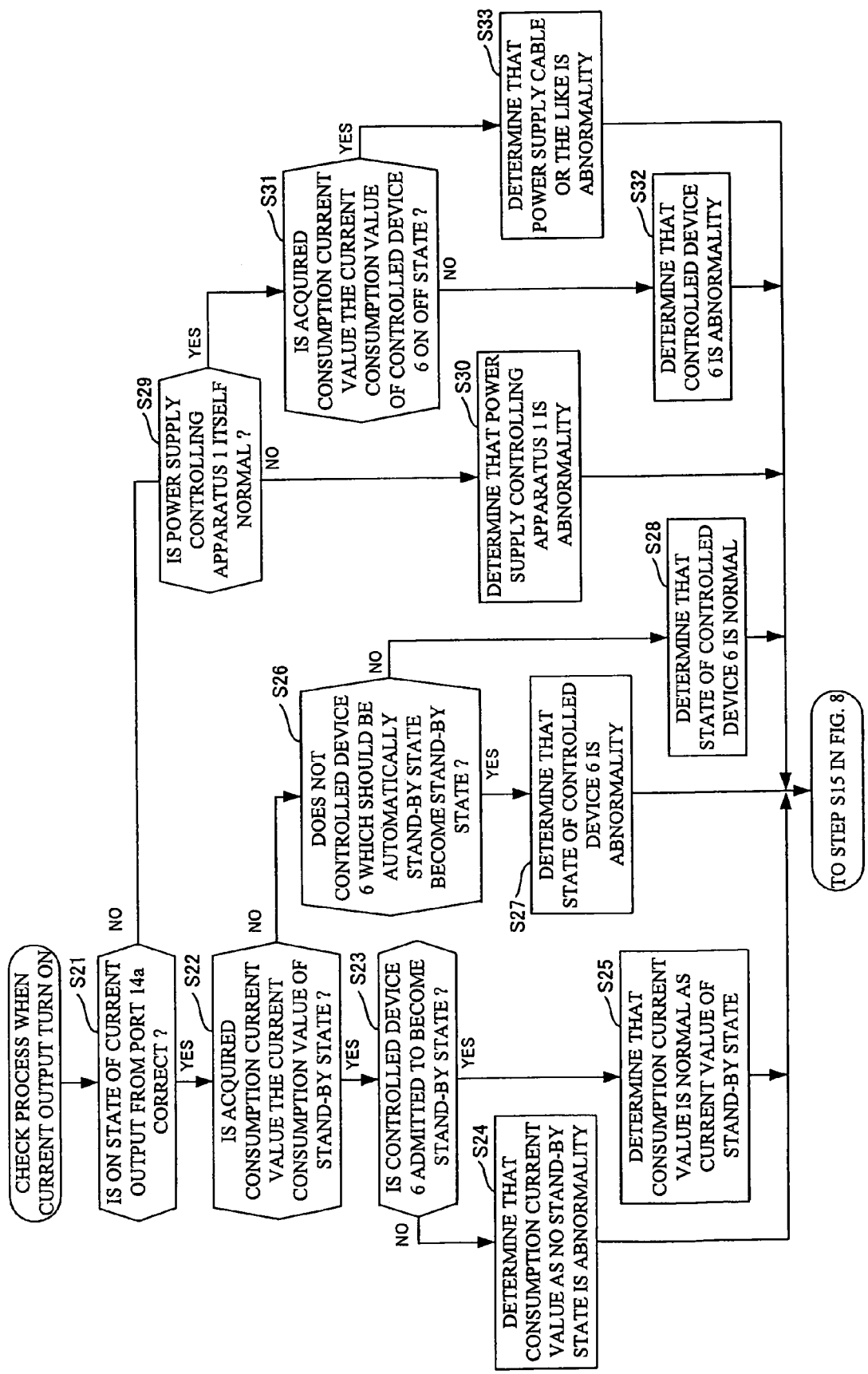

When the determination result of the check process is the procedure of step S24 in FIG. 9, in step S15, the control unit 11 temporarily turns off the current supply to the controlled device 6, and controls the ampere meter & on/off control unit 14 to turn on the current supply after given time has passed, or transmits to the external terminal 5 the electronic mail showing that the controlled device 6 is in an abnormal stand-by state which differs from the contents of the condition data. When the determination result of the check process is the procedure of step S25 in FIG. 9, in step S15, the control unit 11 transmits the electronic mail showing that the controlled device 6 is in a normal stand-by state to the external terminal 5, or does nothing. When the determination result of the check process is the procedure of step S27 in FIG. 9, in step S15, the control unit 11 temporarily turns off the current supply to the controlled device 6, and controls the ampere meter & on/off control unit 14 to turn on the current supply after given time has passed, or transmits the electronic mail showing that the controlled device 6 does not become the stand-by state to the external terminal 5.

When the determination result of the check process is the procedure of step S28 in FIG. 9, in step S15, the control unit 11 transmits the electronic mail showing that the controlled device 6 is in the normal stand-by state to the external terminal 5, or does nothing. When the determination result of the check process is the procedure of step S30 in FIG. 9, in step S15, the control unit 11 transmits the electronic mail showing that the power supply controlling apparatus 1 is failure or malfunction to the external terminal 5 via the communication unit 13, or turns on the failure alert lamp when there is the failure alert lamp, not shown, in the power supply controlling apparatus 1.

When the determination result of the check process is the procedure of step S32 in FIG. 9, in step S15, the control unit 11 transmits the electronic mail showing that the controlled device 6 is failure or malfunction to the external terminal 5 via the communication unit 13. When the determination result of the check process is the procedure of step S33 in FIG. 9, in step S15, the control unit 11 transmits the electronic mail showing that the power supply cable or the like is failure or malfunction to the external terminal 5 via the communication unit 13.

Figure 10:
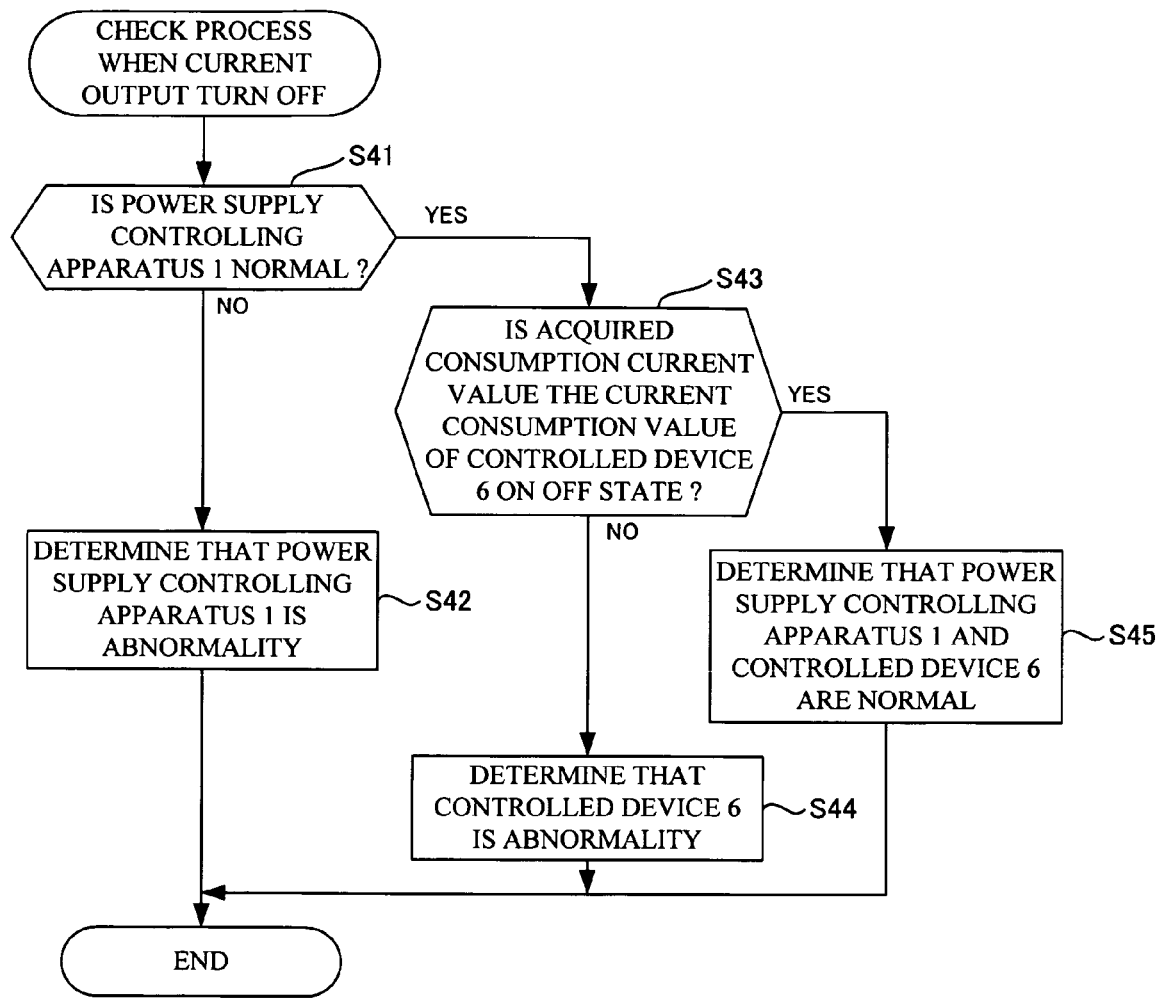
FIG. 10 is a flowchart showing a check process when current output turns off.

When the determination result of the check process is the procedure of step S42 in FIG. 10, in step S15, the control unit 11 transmits the electronic mail showing that the power supply controlling apparatus 1 is failure or malfunction to the external terminal 5 via the communication unit 13, or turns on the failure alert lamp when there is the failure alert lamp, not shown, in the power supply controlling apparatus 1.

When the determination result of the check process is the procedure of step S44 in FIG. 10, in step S15, the control unit 11 transmits the electronic mail showing that the controlled device 6 is failure or malfunction to the external terminal 5 via the communication unit 13.

When the determination result of the check process is the procedure of step S45 in FIG. 10, in step S15, the control unit 11 transmits the electronic mail showing that the power supply controlling apparatus 1 and the controlled device 6 are normal to the external terminal 5 via the communication unit 13, or does nothing. Thus, various actions of step S15 in FIG. 8 can take various states according to the determination result of the check process when the current output turns on, or the check process when the current output turns off.

Next, the control unit 11 transmits the ping command to the controlled device 6 via the communication unit 13 and the network 4 (step S16), and determines whether a response to the ping command is received from the controlled device 6 (step S17).

When the answer to the determination of step S17 is "YES", the procedure proceeds to step S20. On the other hand, when the answer to the determination of step S17 is "NO", the control unit 11 determines whether a number of times of the transmission of the ping command has reached a given number of times (e.g. 5 times) (step S18). The number of times of the transmission of the ping command is set from the external terminal 5 via the communication unit 13 and the network 4, and is stored into the storage unit 12 together with the above-mentioned table data, or is stored into the storage medium 21.

When the answer to the determination of step S18 is "NO", the procedure returns to step S16. On the other hand, when the answer to the determination of step S18 is "YES", the control unit 11 transmits the electronic mail showing that the controlled device 6 is abnormality to the external terminal 5 (step S19). The procedure proceeds to step S20.

Finally, the control unit 11 determines whether the confirmation of all ports has terminated (step S20). When the answer to the determination of step S20 is "YES", the port process is terminated. When the answer to the determination of step S20 is "NO", the procedure returns to step S11 to confirm the next port.

Next, a description will now be given of the check process when the current output turns on, with reference to FIG. 9.

First, the control unit 11 compares the consumption current value of the controlled device 6 which is previously stored into the storage unit 12 with the consumption current value acquired from the ampere meter & on/off control unit 14 in step S11 of FIG. 8, and determines whether the on state of the current output from the port 14a is correct (step S21).

When the answer to the determination of step S21 is "YES", the control unit 11 compares the consumption current value of the controlled device 6 which is previously stored into the storage unit 12 with the consumption current value acquired from the ampere meter & on/off control unit 14 in step S11 of FIG. 8, and determines whether the consumption current value acquired from the ampere meter & on/off control unit 14 in step S11 of FIG. 8 is a current consumption value which the controlled device 6 can adopt on the stand-by state (step S22).

When it is determined in step S22 that the consumption current value acquired from the ampere meter & on/off control unit 14 is the current consumption value which the controlled device 6 can adopt in the stand-by state, the control unit 11 determines whether the controlled device 6 is admitted to become the stand-by state based on the condition data of the port 14*a* (step S23).

When the answer to the determination of step S23 is "YES", the control unit 11 determines that the consumption current value acquired from the ampere meter & on/off control unit 14 in step S11 of FIG. 8 is normal as a current value of the stand-by state (step S25). The procedure proceeds to step S15 in FIG. 8. In this case, the control unit 11 transmits the electronic mail showing that the controlled device 6 is in the normal stand-by state to the external terminal 5, or does nothing.

When the answer to the determination of step S23 is "NO", the controlled device 6 is not admitted to become the stand-by state, and hence the control unit 11 determines that the consumption current value acquired from the ampere meter & on/off control unit 14 is abnormality (step S24). The procedure proceeds to step S15 in FIG. 8. In this case, in step S15 of FIG. 8, the control unit 11 temporarily turns off the current supply to the controlled device 6, and controls the ampere meter & on/off control unit 14 to turn on the current supply after given time has passed, or transmits to the external terminal 5 the electronic mail showing that the controlled device 6 is in the abnormal stand-by state which differs from the contents of the condition data.

When it is determined in step S22 that the consumption current value acquired from the ampere meter & on/off control unit 14 is not the current consumption value which the controlled device 6 can adopt in the stand-by state, the procedure proceeds to step S26. When the controlled device 6 is admitted to become the stand-by state, and automatically becomes the stand-by state after given time (e.g. one minute) elapses from the beginning of the stability operation, the control unit 11 measures the elapsed time based on time information from the timer 18 after the current supply to the controlled device 6 is turned on, and determines whether the controlled device 6 does not become the stand-by state even if the given time (e.g. one minute) has elapsed (step S26).

When the answer to the determination of step S26 is "YES", the controlled device 6 which should become the stand-by state originally does not become the stand-by state yet, and hence the control unit 11 determines that the state of the controlled device 6 is abnormality (step S27). The procedure proceeds to step S15 in FIG. 8. In this case, in step S15 of FIG. 8, the control unit 11 temporarily turns off the current supply to the controlled device 6, and controls the ampere meter & on/off control unit 14 to turn on the current supply after given time has passed, or transmits to the external terminal 5 the electronic mail showing that the controlled device 6 does not become the stand-by state.

When the answer to the determination of step S26 is "NO", the controlled device 6 becomes the stand-by state, and hence the control unit 11 determines that the state of the controlled device 6 is normal (step S28). The procedure proceeds to step S15 in FIG. 8. In this case, in step S15 of FIG. 8, the control unit 11 transmits to the external terminal 5 the electronic mail showing that the controlled device 6 is in the normal stand-by state, or does nothing.

When the answer to the determination of step S21 is "NO", the control unit 11 compares the consumption current value of the power supply controlling apparatus 1 which is previously stored into the storage unit 12 with a real consumption current value, and determines whether the power supply controlling apparatus 1 itself is normal (step S29).

When the answer to the determination of step S29 is "NO", the control unit 11 determines that the power supply controlling apparatus 1 is abnormality (step S30). The procedure proceeds to step S15 in FIG. 8. In this case, in step S15 of FIG. 8, the control unit 11 transmits the electronic mail showing that the power supply controlling apparatus 1 is failure or malfunction to the external terminal 5 via the communication unit 13, or turns on the failure alert lamp when there is the failure alert lamp, not shown, in the power supply controlling apparatus 1.

When the answer to the determination of step S29 is "YES", the control unit 11 compares the consumption current value of the controlled device 6 which is previously stored into the storage unit 12 with the consumption current value acquired from the ampere meter & on/off control unit 14 in step S11 of FIG. 8, and determines whether the consumption current value acquired from the ampere meter & on/off control unit 14 in step S11 of FIG. 8 is a current consumption value which the controlled device 6 can adopt on the off state (step S31).

When the answer to the determination of step S31 is "NO", the control unit 11 determines that the controlled device 6 is abnormality (step S32). The procedure proceeds to step S15 in FIG. 8. In this case, in step S15 of FIG. 8, the control unit 11 transmits the electronic mail showing that the controlled device 6 is failure or malfunction to the external terminal 5 via the communication unit 13.

When the answer to the determination of step S31 is "YES", the control unit 11 determines that the power supply cable or the like connected between the controlled device 6 and the power supply controlling apparatus 1 is abnormality (step S33). The procedure proceeds to step S15 in FIG. 8. In this case, in step S15 of FIG. 8, the control unit 11 transmits the electronic mail showing that the power supply cable or the like is failure or malfunction to the external terminal 5 via the communication unit 13.

Next, a description will now be given of the check process when the current output turns off, with reference to FIG. 10.

First, the control unit 11 compares the consumption current value of the power supply controlling apparatus 1 which is previously stored into the storage unit 12 with a real consumption current value, and determines whether the power supply controlling apparatus 1 itself is normal (step S41).

When the answer to the determination of step S41 is "NO", the control unit 11 determines that the power supply controlling apparatus 1 is abnormality (step S42). The procedure proceeds to step S15 in FIG. 8. In this case, in step S15 of FIG. 8, the control unit 11 transmits the electronic mail showing that the power supply controlling apparatus 1 is failure or malfunction to the external terminal 5 via the communication unit 13, or turns on the failure alert lamp when there is the failure alert lamp, not shown, in the power supply controlling apparatus 1.

When the answer to the determination of step S41 is "YES", the control unit 11 compares the consumption current value of the controlled device 6 which is previously stored into the storage unit 12 with the consumption current value acquired from the ampere meter & on/off control unit 14 in step S11 of FIG. 8, and determines whether the consumption current value acquired from the ampere meter & on/off control unit 14 in step S11 of FIG. 8 is a current consumption value which the controlled device 6 can adopt on the off state (step S43).

When the answer to the determination of step S43 is "NO", the control unit 11 determines that the controlled device 6 is abnormality (step S44). The procedure proceeds to step S15 in FIG. 8. In this case, in step S15 of FIG. 8, the control unit 11 transmits the electronic mail showing that the controlled device 6 is failure or malfunction to the external terminal 5 via the communication unit 13.

When the answer to the determination of step S43 is "YES", the control unit 11 determines that the power supply controlling apparatus 1 and the controlled device 6 are normal (step S45). The procedure proceeds to step S15 in FIG. 8. In this case, in step S15 of FIG. 8, the control unit 11 transmits the electronic mail showing that that the power supply controlling apparatus 1 and the controlled device 6 are normal to the external terminal 5 via the communication unit 13, or does nothing.

Although in the above-mentioned check process in FIG. 9 when the current output turns on and the above-mentioned check process in FIG. 10 when the current output turns off, the control unit 11 checks the consumption current and the state of the controlled device 6, normal/abnormality of the power supply controlling apparatus 1 and the controlled device 6, and so on, the check processes when the current output turns on and off are limited to this. For example, when three pieces of condition data, i.e., (1) the controlled device 6 does not become the stand-by state, (2) in the state of turning on the current output from the port 14a, the current consumption value of the controlled device 6 is 3 A or more, and (3) the current output from the port 14a is not turned off at 7:00 to 23:00, are registered with the storage unit 12, the control unit 11 sequentially checks whether the three conditions are satisfied as the check process when the current output turns on. When the condition (1) is "NO" and the conditions (2) and (3) are "OK", the control unit 11 temporarily turns off the current supply to the controlled device 6 in order to restart the controlled device 6, and controls the ampere meter & on/off control unit 14 to turn on the current supply after given time has passed, or transmits to the external terminal 5 the electronic mail showing that the controlled device 6 is in the stand-by state, as the procedure of step S15 in FIG. 8. When the condition (2) is "NO" and the conditions (1) and (3) are "OK", the control unit 11 transmits to the external terminal 5 the electronic mail showing that the consumption current value of the controlled device 6 is abnormality, as the procedure of step S15 in FIG. 8. When the condition (3) is "NO" and the conditions (1) and (2) are "OK", the control unit 11 transmits to the external terminal 5 the electronic mail showing that it is prohibited to turn off the current output from the port 14a at 7:00 to 23:00, as the procedure of step S15 in FIG. 8.

Figure 11:
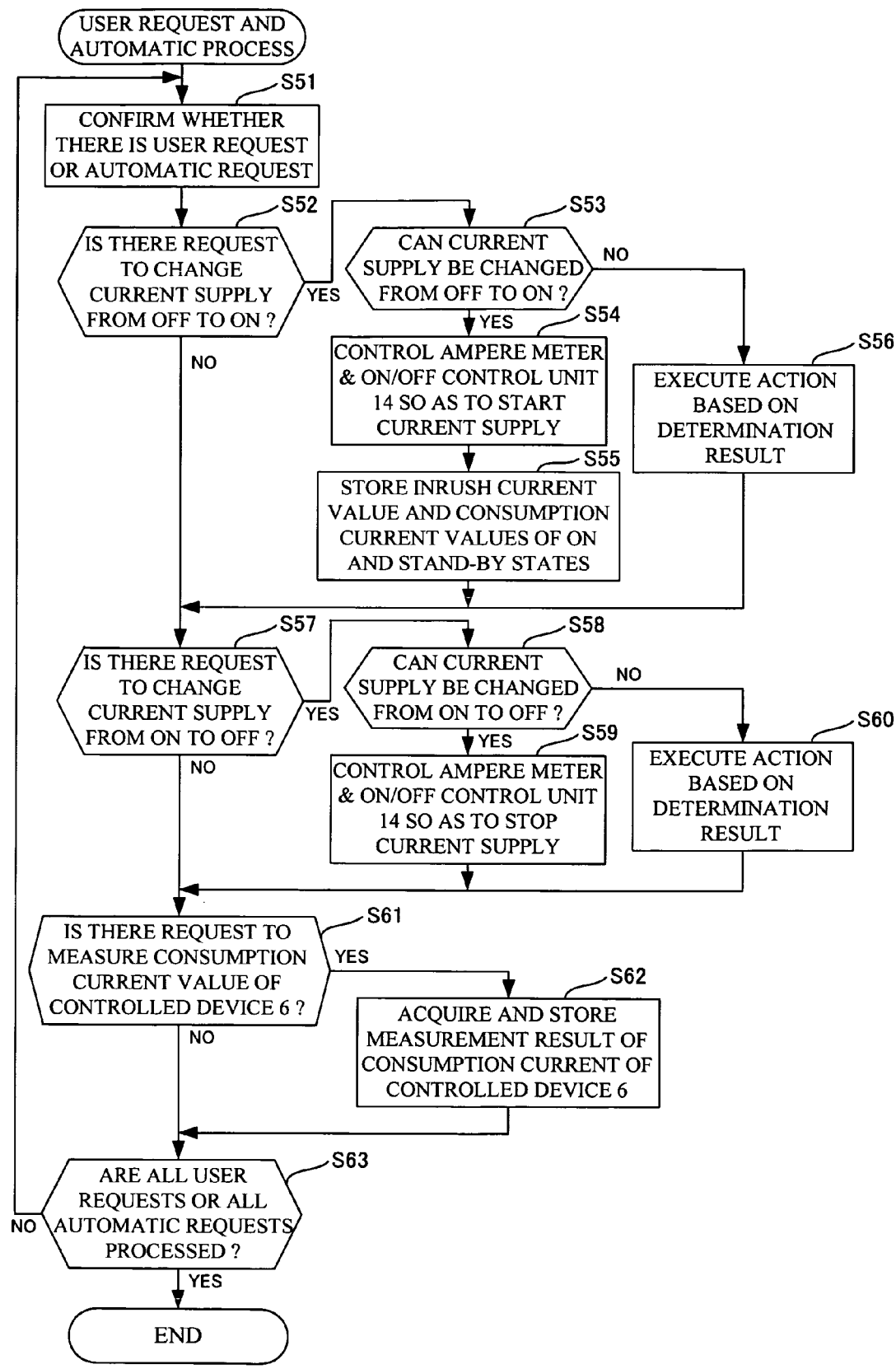
FIG. 11 is a flowchart showing in detail a user request and automatic process in step S3 of FIG. 6.

FIG. 11 is a flowchart showing in detail the user request and automatic process in step S3 of FIG. 6. Although the present process is explained by using the port 14a and the controlled device 6 as the representative of the ports and the controlled devices, the present process is also executed to the ports 15a to 17a and the controlled devices 7 to 9.

First, the control unit 11 confirms whether there is a user request from the external terminal 5 or an automatic request from the condition data (step S51). Specifically, the control unit 11 has a queue that accumulates the user request from the external terminal 5 and the automatic request from the condition data, and can confirm whether these requests exist by confirming this queue.

Next, the control unit 11 determines whether there is a request to change the current supply to the controlled device 6 from the port 14a from off to on (step S52).

When the answer to the determination of step S52 is "YES", the control unit 11 determines whether the current supply to the controlled device 6 can be changed from off to on, based on the condition data (step S53). For example, when the total of the consumption currents does not exceed 5 A even if the current supply to the controlled device 6 is changed from off to on, or when it is previously set to turn off the current supply from the port 14a from 11:00 PM to 7:00 AM, and the present time is 3:00 PM, the control unit 11 determines that the current supply to the controlled device 6 can be changed from off to on. On the other hand, when the current supply to the controlled device 6 is changed from off to on, so that the total of the consumption currents exceeds 5 A because of an inrush current, or when it is previously set to turn off the current supply from the port 14a from 11:00 PM to 7:00 AM, and the present time is 3:00 AM, the control unit 11 determines that the current supply to the controlled device 6 cannot be changed from off to on.

When there are a plurality of pieces of condition data for the port 14a, and all pieces of condition data are satisfied, the control unit 11 determines that the current supply to the controlled device 6 can be changed from off to on. On the other hand, when a single piece of condition data alone is satisfied, the control unit 11 determines that the current supply to the controlled device 6 cannot be changed from off to on.

When the answer to the determination of step S53 is "YES", the control unit 11 controls the ampere meter & on/off control unit 14 so as to start the current supply to the controlled device 6 from the port 14a (step S54). Thereby, the current supply to the controlled device 6 from the port 14a is started.

The control unit 11 starts the current supply to the controlled device 6 via the ampere meter & on/off control unit 14, simultaneously samples the consumption current values of the controlled device 6 for a certain period, and stores a peak value as an inrush current value and the consumption current values of the controlled device 6 in the on state and the stand-by state into the storage unit 12 (step S55). The procedure proceeds to step S57. Thereby, the inrush current values when the controlled devices 6 to 9 start up can be measured accurately.

When the answer to the determination of step S53 is "YES", the control unit 11 executes an action based on the determination result (step S56). For example, the control unit 11 transmits the electronic mail showing a reason in which the current supply to the controlled device 6 cannot be changed from off to on to the external terminal 5 via the communication unit 13. Also, when the current supply to the controlled device 6 cannot be changed from off to on because of the inrush current, the control unit 11 delays timing in which the current supply to the controlled device 6 is changed from off to on.

Next, the control unit 11 determines whether there is a request to change the current supply to the controlled device 6 from the port 14a from on to off (step S57).

When the answer to the determination of step S57 is "YES", the control unit 11 determines whether the current supply to the controlled device 6 can be changed from on to off, based on the condition data (step S58).

When the answer to the determination of step S58 is "YES", The control unit 11 controls the ampere meter & on/off control unit 14 so as to stop the current supply to the controlled device 6 from the port 14a (step S59). Thereby, the current supply to the controlled device 6 from the port 14a is stopped.

When the answer to the determination of step S58 is "NO", the control unit 11 executes an action based on the determination result (step S60). For example, the control unit 11 transmits the electronic mail showing a reason in which the current supply to the controlled device 6 cannot be changed from on to off (e.g. it is time now to prohibit turning off the power supply, etc.) to the external terminal 5 via the communication unit 13.

Next, the control unit 11 determines whether there is a request to measure the consumption current value of the controlled device 6 (step S61).

When the answer to the determination of step S61 is "YES", the control unit 11 acquires a measurement result of the consumption current of the controlled device 6 from the ampere meter & on/off control unit 14, and stores the measurement result into the storage unit 12 (step S62).

Finally, the control unit 11 determines whether all user requests from the external terminal 5 or all automatic requests from the condition data are processed (step S63). Specifically, when the queue included in the control unit 11 has no user requests from the external terminal 5 or no automatic requests from the condition data, the control unit 11 determines that all user requests or all automatic requests are processed. When the answer to the determination of step S63 is "NO", the procedure returns to step S52. On the there hand, when the answer to the determination of step S63 is "YES", the present process is terminated.

As described hereinabove, according to the present embodiment, the ampere meters & on/off control units 14 to 17 measure the consumption current values of the currents supplied to the controlled devices 6 to 9, and control on/off of the currents supplied to the controlled devices 6 to 9. The communication unit 13 transmits the ping commands to the controlled devices 6 to 9, and receives the responses to the ping commands. The control unit 11 monitors the states of the controlled devices 6 to 9 based on the consumption current values of the controlled devices 6 to 9 measured with the ampere meters & on/off control units 14 to 17, and life or death states of the controlled devices 6 to 9 by the ping commands. Therefore, the controlled devices 6 to 9 are monitored by a double method, so that the states of the controlled devices 6 to 9 can be monitored accurately.

For example, when the controlled devices 6 to 9 are a system composed of displays and computers which are provided at a waiting area for leaving the country in the airport, an administrator of the controlled devices 6 to 9 cannot freely go in and out to the waiting area for leaving the country in the airport, so that it is not easy for the administrator to watch the states of the controlled device 6 to 9. In such an environment, the controlled devices 6 to 9 are monitored by a double method with the power supply controlling apparatus 1, so that the states of the controlled devices 6 to 9 can be monitored accurately.

Also, since the ampere meters & on/off control units 14 to 17 automatically measure the consumption current values of the currents supplied to the controlled devices 6 to 9, the user can eliminate the need for inputting the consumption current values of the controlled devices 6 to 9 to the power supply controlling apparatus 1. In addition, the ampere meters & on/off control units 14 to 17 can accurately measure the inrush current values measured when the controlled devices 6 to 9 start.

Also, the storage unit 12 stores normal consumption current values of the controlled devices 6 to 9 when the power supply turns on, normal consumption current values of the controlled devices 6 to 9 when the power supply turns off, normal consumption current values of the controlled devices 6 to 9 on the stand-by state, and normal consumption current values of the controlled devices 6 to 9 when the controlled devices 6 to 9 start up. The control unit 11 determines the states of the controlled devices 6 to 9 by comparing the consumption current values measured by the ampere meters & on/off control units 14 to 17 with the various consumption current values stored into the storage unit 12. Therefore, the control unit 11 can determine whether each of the present states of the controlled devices 6 to 9 is any one of a normal state of turning on the power supply, a normal state of turning off the power supply, a normal stand-by state, a normal start-up state, and an abnormal on/off/stand-by/start-up state.

Further, the control unit 11 executes any one of controlling the ampere meters & on/off control units 14 to 17 so as to turn on or off the currents supplied to the controlled devices 6 to 9 based on the monitor results of the controlled devices 6 to 9, and controlling the ampere meters & on/off control units 14 to 17 so as to restart the controlled devices 6 to 9 based on the monitor results of the controlled devices 6 to 9. Therefore, it is possible to control the controlled devices 6 to 9 based on the monitor results of the controlled devices 6 to 9.

The communication unit 13 notifies the external terminal 5 of the monitor results of the controlled devices 6 to 9 by the control unit 11, so that it is possible to notify a remote user of the monitor results of the controlled devices 6 to 9.

Further, the storage unit 12 stores the consumption current value of the power supply controlling apparatus 1 when the power supply controlling apparatus 1 is normal, and the control unit 11 monitors the state of the power supply controlling apparatus 1 itself based on the consumption current value of the power supply controlling apparatus 1 when the power supply controlling apparatus 1 is normal, which is stored into the storage unit 12. Therefore, it is possible to monitor not only the states of the controlled devices 6 to 9 but also the state of the power supply controlling apparatus 1 itself.

The storage unit 12 stores the setting number (i.e., identification information) associated with each port, and the condition data providing a condition which decides on/off of the current supply and is associated with each port. The control unit 11 controls the ampere meters & on/off control units 14 to 17 so as to turn on or off the currents supplied to the controlled devices 6 to 9 based on the condition data, and when the controlled devices 6 to 9 are interchanged and connected to the ports 14a to 17a, the control unit 11 interchanges plural sets of the setting number and the condition data stored into the storage unit 12 depending on the interchange of the controlled devices 6 to 9. Therefore, even when the controlled devices 6 to 9 are interchanged, it is possible to control the controlled devices 6 to 9 based on appropriate condition data.

The power supply controlling apparatus 1 may be composed of a personal computer (PC). In this case, a recording medium on which the software program for realizing the functions of the power supply controlling apparatus 1 is recorded may be supplied to the PC, and the CPU in the PC may read and execute the program recorded on the recording medium. In this manner, the same effects as those of the above-described first to fourth embodiments can be achieved.

The recording medium for providing the program may be a CD-ROM, a DVD, or a SD card, for example.

The CPU in the PC may execute the software program for realizing the functions of the PC. In this manner, the same effects as that of the above-described embodiment can also be achieved.

It should be noted that the present invention is not limited to the embodiment, and various modifications may be made to them without departing from the scope of the invention.

The Present application is based on Japanese Patent Application No. 2008-005012 filed Jan. 11, 2008 the entire disclosure of which is hereby incorporated by reference.

What is claimed is:

1. A power supply controlling apparatus comprising:
a plurality of control portions, each control portion measuring a consumption current value of a current supplied to a corresponding controlled device and controlling on/off of the current supplied to the corresponding controlled device;
a plurality of connection portions to which the plurality of controlled devices are connected;
a storage portion that stores a plurality of pieces of identification information, including a setting number, associated with the connection portions, and a plurality of pieces of condition data providing conditions which decide on/off of the current supply by the control portions, and are associated with the connection portions;
a communication portion that transmits a ping command to each controlled device, and is configured to receive a response to the ping command; and
a monitor portion that monitors a state of each of the controlled devices based on the consumption current value of the respective controlled device measured by each control portion and a response or no response state of the respective controlled device by the ping command, the monitor portion controlling the control portions so as to turn on or off the currents supplied to the controlled devices based on the plurality of pieces of condition data, wherein
when the controlled devices are interchanged and connected to the connection portions, the monitor portion interchanges plural sets of the setting number and the condition data stored into the storage portion depending on the interchange of the controlled devices.

2. The power supply controlling apparatus as claimed in claim 1, wherein the storage portion stores a normal consumption current value of each controlled device when a power supply turns on, a normal consumption current value of each controlled device when the power supply turns off, a normal consumption current value of each controlled device on a stand-by state, and a normal consumption current value of each controlled device when the controlled device starts up,
wherein the monitor portion determines the state of each controlled device by comparing the consumption current value measured by each control portion with various consumption current values stored into the storage portion.

3. The power supply controlling apparatus as claimed in claim 1, wherein the monitor portion executes any one of controlling each control portion so as to turn on or off the current supplied to each controlled device based on a monitor result of the respective controlled device, and controlling each control portion so as to restart the respective controlled device based on the monitor result of the respective controlled device.

4. The power supply controlling apparatus as claimed in claim 1, wherein the communication portion notifies an external terminal of the monitor result of each controlled device by the monitor portion.

5. The power supply controlling apparatus as claimed in claim 2, wherein:
the storage portion further stores a consumption current value of the power supply controlling apparatus when the power supply controlling apparatus is normal; and
the monitor portion monitors a state of the power supply controlling apparatus itself based on the consumption current value of the power supply controlling apparatus stored into the storage portion.

6. The power supply controlling apparatus as claimed in claim 1, wherein when an external storage medium storing at least one of the identification information and the condition data is connected to any one of the connection portions, the monitor portion interchanges the plural sets of the identification information and the condition data stored into the storage portion, or rewrites at least one of the identification information and the condition data stored into the storage portion, based on the at least one of the identification information and the condition data stored into the external storage medium.

7. The power supply controlling apparatus as claimed in claim 2, wherein the monitor portion executes any one of controlling each control portion so as to turn on or off the current supplied to each controlled device based on a monitor result of the respective controlled device, and controlling each control portion so as to restart the respective controlled device based on the monitor result of the respective controlled device.

8. The power supply controlling apparatus as claimed in claim 2, wherein the communication portion notifies an external terminal of the monitor result of each controlled device by the monitor portion.

9. The power supply controlling apparatus as claimed in claim 3, wherein the communication portion notifies an external terminal of the monitor result of each controlled device by the monitor portion.

10. The power supply controlling apparatus as claimed in claim 1, wherein the monitor portion determines that each controlled device is in the no response state after a predetermined number of ping commands have been transmitted by the communication portion without a response from the respective controlled device.

11. The power supply controlling apparatus as claimed in claim 1, wherein the condition data providing conditions include a maximum value of a current consumption of each controlled device.

12. A computer readable medium causing a computer to execute a process, the process comprising:
measuring a consumption current value of a current supplied to each of a plurality of controlled devices, and controlling on/off of the current supplied to the each of the controlled devices, each of the controlled devices being connected to a respective connection portion, the connection portions being associated with a respective control portion;
storing a plurality of pieces of identification information, including a setting number, associated with the connection portions, and a plurality of pieces of condition data providing conditions which decide on/off of the current supply by the control portions and are associated with the connection portions;
transmitting a ping command to each controlled device, and receiving a response to the ping command;

monitoring a state of each of the controlled devices based on the measured consumption current value of the respective controlled device and a response or no response state of the respective controlled device by the ping command and controlling the control portions so as to turn on or off the currents supplied to the controlled devices based on the plurality of pieces of condition data; and when the controlled devices are interchanged and connected to the connection portions, interchanging plural sets of the setting number and the condition data that is stored depending on the interchange of the controlled devices.

* * * * *